(12) United States Patent
Fukae et al.

(10) Patent No.: US 12,021,263 B2
(45) Date of Patent: Jun. 25, 2024

(54) BATTERY AND METHOD OF MANUFACTURING SAME

(71) Applicant: Prime Planet Energy & Solutions, Inc., Tokyo (JP)

(72) Inventors: Toshihide Fukae, Kakogawa (JP); Akira Nishida, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 124 days.

(21) Appl. No.: 17/583,214

(22) Filed: Jan. 25, 2022

(65) Prior Publication Data

US 2022/0238961 A1 Jul. 28, 2022

(30) Foreign Application Priority Data

Jan. 27, 2021 (JP) .................................. 2021-011115

(51) Int. Cl.
| | |
|---|---|
| *H01M 50/46* | (2021.01) |
| *H01M 4/48* | (2010.01) |
| *H01M 50/40* | (2021.01) |
| *H01M 50/403* | (2021.01) |
| *H01M 50/44* | (2021.01) |
| *H01M 50/446* | (2021.01) |
| *H01M 4/02* | (2006.01) |

(52) U.S. Cl.
CPC ........... *H01M 50/461* (2021.01); *H01M 4/48* (2013.01); *H01M 50/403* (2021.01); *H01M 50/446* (2021.01); *H01M 2004/027* (2013.01); *H01M 2004/028* (2013.01)

(58) Field of Classification Search
CPC ............. H01M 50/403; H01M 50/441; H01M 50/461; H01M 50/446; H01M 4/48
See application file for complete search history.

(56) References Cited

U.S. PATENT DOCUMENTS

| | | | | |
|---|---|---|---|---|
| 2015/0004464 | A1* | 1/2015 | Okuno | H01M 10/0525 429/143 |
| 2015/0140403 | A1* | 5/2015 | Moon | H01M 10/058 429/144 |
| 2015/0263324 | A1* | 9/2015 | Lee | H01M 50/426 427/532 |
| 2015/0311490 | A1* | 10/2015 | Murase | H01M 4/139 524/521 |
| 2018/0309108 | A1* | 10/2018 | Shin | H01M 50/42 |
| 2020/0058914 | A1 | 2/2020 | Kusada et al. | |

FOREIGN PATENT DOCUMENTS

WO 2018207530 A1 11/2018

\* cited by examiner

*Primary Examiner* — Kenneth J Douyette
(74) *Attorney, Agent, or Firm* — HAUPTMAN HAM, LLP

(57) ABSTRACT

A battery includes an electrode assembly including a positive electrode plate, a negative electrode plate, and a separator disposed between the positive electrode plate and the negative electrode plate. A first adhesive layer is provided between the positive electrode plate and the separator, and a second adhesive layer is provided between the negative electrode plate and the separator. A coating weight of the first adhesive layer is smaller than a coating weight of the second adhesive layer, and a total of the coating weight of the first adhesive layer and the coating weight of the second adhesive layer is more than or equal to 0.03 g/m² and less than or equal to 0.15 g/m².

10 Claims, 7 Drawing Sheets

BATTERY AND METHOD OF MANUFACTURING SAME

This nonprovisional application is based on Japanese Patent Application No. 2021-011115 filed on Jan. 27, 2021, with the Japan Patent Office, the entire contents of which are hereby incorporated by reference.

BACKGROUND OF THE INVENTION

Field of the Invention

The present technology relates to a battery and a method of manufacturing the battery.

Description of the Background Art

There has been conventionally known a battery including an electrode assembly including a positive electrode plate, a negative electrode plate, and a separator disposed between the positive electrode plate and the negative electrode plate, wherein an adhesive layer is provided between each electrode plate (the positive electrode plate and the negative electrode plate) and the separator.

When adhesive force between the electrode plate (particularly, the positive electrode plate) and the separator is too strong in the electrode assembly, a clearance may not be sufficiently provided between the electrode plates in a cell drying step, with the result that a path for drying out moisture from a cell may be unable to be appropriately secured. In this case, remaining moisture reacts with an electrode active material to generate a gas, with the result that the cell is likely to be expanded. Therefore, it is necessary to secure a path for appropriately drying out moisture during the drying step. In view of the above, the conventional battery does not necessarily have a sufficient configuration.

SUMMARY OF THE INVENTION

An object of the present technology is to provide a battery and a method of manufacturing the battery so as to suppress expansion of a cell.

A battery according to the present technology includes an electrode assembly including a positive electrode plate, a negative electrode plate, and a separator disposed between the positive electrode plate and the negative electrode plate. A first adhesive layer is provided between the positive electrode plate and the separator, and a second adhesive layer is provided between the negative electrode plate and the separator. A coating weight of the first adhesive layer is smaller than a coating weight of the second adhesive layer, and a total of the coating weight of the first adhesive layer and the coating weight of the second adhesive layer is more than or equal to 0.03 g/m$^2$ and less than or equal to 0.15 g/m$^2$.

A method of manufacturing a battery according to the present technology includes forming an electrode assembly including a positive electrode plate, a negative electrode plate, and a separator disposed between the positive electrode plate and the negative electrode plate, the separator having a first surface facing the positive electrode plate and a second surface facing the negative electrode plate. The forming of the electrode assembly includes: forming a first adhesive layer on the first surface of the separator and forming a second adhesive layer on the second surface of the separator; adhering the separator and the positive electrode plate to each other with the first adhesive layer being interposed between the separator and the positive electrode plate; and adhering the separator and the negative electrode plate to each other with the second adhesive layer being interposed between the separator and the negative electrode plate. A coating weight of the first adhesive layer is smaller than a coating weight of the second adhesive layer, and a total of the coating weight of the first adhesive layer and the coating weight of the second adhesive layer is more than or equal to 0.03 g/m$^2$ and less than or equal to 0.15 g/m$^2$.

It should be noted that in the present specification, the "coating weight" of the adhesive layer refers to the mass of adhesive particles included in the adhesive layer per unit area of an adhesion surface. A theoretical value of the "coating weight" is found by (the area of the adhesive layer per unit area)×(the thickness of the adhesive layer)×(the density of the adhesive layer); however, the theoretical value of the "coating weight" can be uniquely found also by measuring the number of adhesive particles included per unit area.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
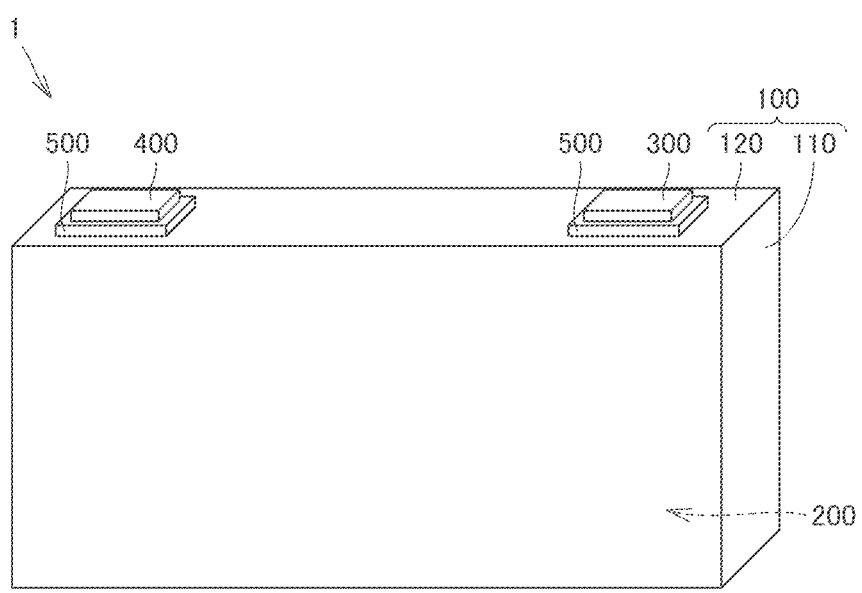
FIG. 1 is a perspective view of a prismatic secondary battery.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

FIG. 1 is a perspective view of a prismatic secondary battery 1. As shown in FIG. 1, prismatic secondary battery 1 includes a battery case 100, an electrode assembly 200, a positive electrode terminal 300, a negative electrode terminal 400, and an insulating member 500.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Electrode assembly 200 is accommodated in battery case 100 together with an electrolyte solution. Each of positive electrode terminal 300 and negative electrode terminal 400 is fixed to sealing plate 120 with an insulating member 500 being interposed therebetween, insulating member 500 being composed of a resin.

The battery of the present technology is not limited to the prismatic shape. The shapes of battery case 100 and electrode assembly 200 are not particularly limited. For example, electrode assembly 200 may be of a stack type, flat type, or cylindrical type. Preferably, electrode assembly 200 is a stack type electrode assembly.

When manufacturing prismatic secondary battery 1, electrode assembly 200 is accommodated in prismatic exterior body 110, and then prismatic exterior body 110 is sealed by sealing plate 120. In this state, a drying step is performed to dry inside of battery case 100. By the drying step, moisture included in an adhesive material used in the manufacturing of electrode assembly 200 is dried out. Thereafter, the electrolyte solution is injected into battery case 100 through an injection hole provided in sealing plate 120.

Figure 2:
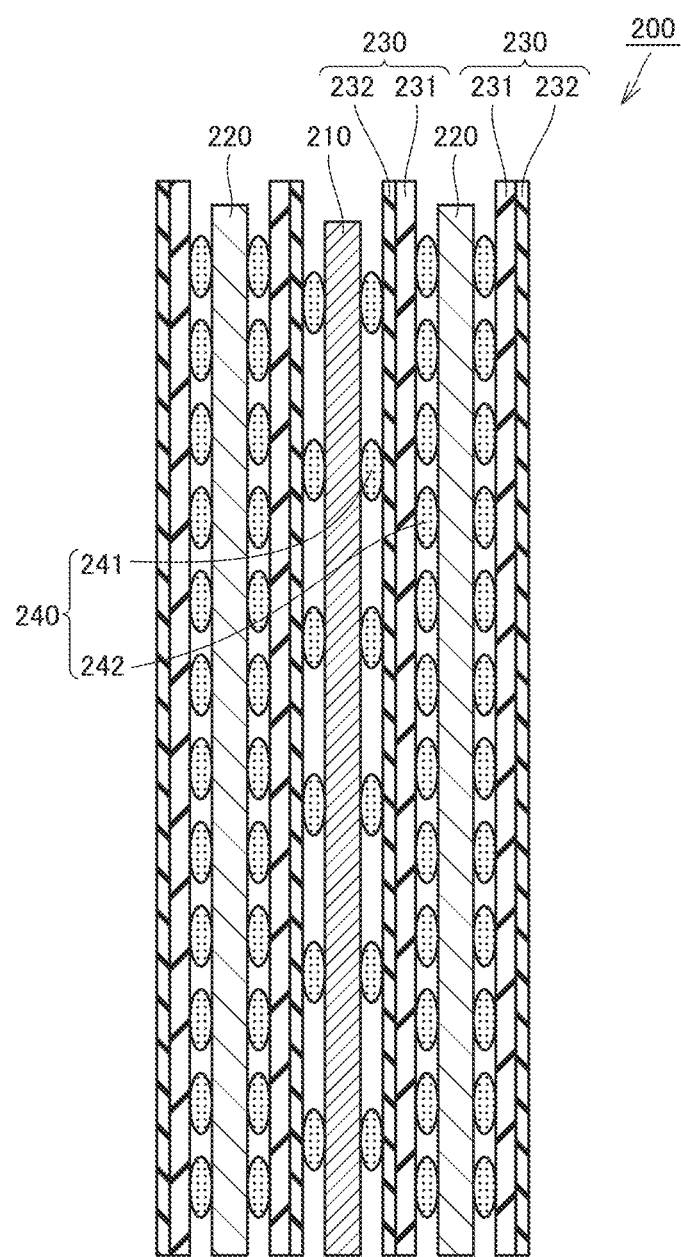
FIG. 2 is a cross sectional view showing a structure of an electrode assembly according to one embodiment.
Figure 3:
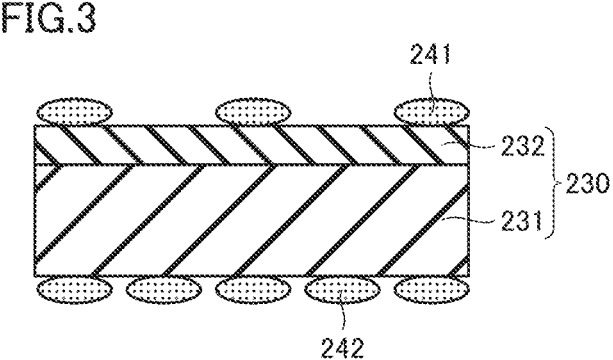
FIG. 3 is a cross sectional view showing a separator and adhesive layers in the electrode assembly shown in FIG. 2.

FIG. 2 is a cross sectional view showing a structure of electrode assembly 200 including positive electrode plates 210, negative electrode plates 220, separators 230, and adhesive layers 240. FIG. 3 is a cross sectional view showing separator 230 and adhesive layers 240 in electrode assembly 200.

Electrode assembly 200 has a structure in which the plurality of positive electrode plates 210, the plurality of negative electrode plates 220, and the plurality of separators 230 are stacked in the order of positive electrode plate 210, separator 230, negative electrode plate 220, and separator 230. Generally, negative electrode plates 220 are disposed as electrode plates located at both ends of electrode assembly 200 in the stacking direction.

Electrode assembly 200 may have a structure in which one separator 230 is folded in a meandering manner to be interposed between positive electrode plates 210 and negative electrode plates 220; however, in the example of FIG. 2, separators 230 in the form of individual sheets are used.

Each of positive electrode plates 210 includes: a positive electrode core body; and a positive electrode composite layer formed on the positive electrode core body. For the positive electrode core body, there can be used: a foil of a metal, such as aluminum, stable in a potential range of positive electrode plate 210; a film having the metal disposed on a surface layer thereof; or the like, for example. The positive electrode composite layer can include a positive electrode active material, a conductive material, and a binder. The positive electrode composite layer is generally formed on each of both surfaces of the positive electrode core body. Positive electrode plate 210 can be produced by forming the positive electrode composite layer on each of the both surfaces of the positive electrode core body. The positive electrode composite layer can be formed on each of the both surfaces of the positive electrode core body by applying a positive electrode composite slurry including the positive electrode active material, the conductive material, the binder, and the like, drying the applied film, and then performing rolling.

Examples of the positive electrode active material for forming the positive electrode composite layer include a lithium-containing transition metal oxide. Examples of metal element(s) included in the lithium-containing transition metal oxide include at least one selected from magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among these, the positive electrode active material preferably include at least one selected from cobalt, nickel, and manganese.

Examples of the conductive material for forming the positive electrode composite layer include carbon materials such as carbon black (CB), acetylene black (AB), Ketjen Black, and graphite. Examples of materials usable as the binder include an organic-resin-based material, an acrylic-resin-based material, an epoxy-resin-based material, a styrene-butadiene-rubber-based material, a silicone-rubber-based material, a polyvinylidene-difluoride (PVdF)-based material, and the like. Each of them may be solely used or two or more of them may be used in combination.

Each of negative electrode plates 220 includes: a negative electrode core body; and a negative electrode composite layer formed on the negative electrode core body. For the negative electrode core body, there can be used: a foil of a metal, such as copper, stable in a potential range of negative electrode plate 220; a film having the metal disposed on a surface layer thereof; or the like, for example. The negative electrode composite layer can include not only a negative electrode active material but also a binder. The negative electrode composite layer is generally formed on each of both surfaces of the negative electrode core body. Negative electrode plate 220 can be produced by forming the negative electrode composite layer on each of the both surfaces of the negative electrode core body. The negative electrode composite layer can be formed on each of the both surfaces of the negative electrode core body by applying a negative electrode composite slurry including the negative electrode active material, the conductive material, the binder, and the like, drying the applied film, and then performing rolling.

The negative electrode active material for forming the negative electrode composite layer is not particularly limited as long as lithium ions can be reversibly occluded and released, and examples of materials usable as the negative electrode active material include: a carbon material such as natural graphite or artificial graphite; a metal that can be alloyed with lithium, such as silicon (Si) or tin (Sn); an alloy including a metal element such as silicon or tin; a composite oxide; and the like. Each of the above-listed negative electrode active materials may be solely used or two or more of the above-listed negative electrode active materials may be used in combination. The negative electrode active material preferably includes the carbon material, the silicon material, or the lithium metal. More preferably, the negative electrode active material is mainly composed of the carbon material.

As the binder included in the negative electrode composite layer, the same material as that in the positive electrode composite layer can be used. When the negative electrode composite slurry is prepared using a water-based solvent, a styrene-butadiene rubber (SBR), carboxymethyl cellulose (CMC) or a salt thereof, polyacrylic acid (PAA) or a salt thereof, polyvinyl alcohol (PVA), or the like may be used.

As positive electrode plate 210, for example, a comparatively large-sized positive electrode plate can be used which has a size with a long side of more than or equal to 100 mm (as one example, about 140 mm) and a short side of more than or equal to 50 mm (as one example, a height of about 70 mm). For example, 50 or more (as one example, about 60) positive electrode plate 210 and 50 or more (as one example, about 60) negative electrode plate 220 can be stacked.

Each of separators 230 is constituted of: a porous substrate 231; and a porous heat-resistant layer 232 formed on one surface of substrate 231. By providing heat-resistant layer 232, separator 230 is less likely to be raptured due to, for example, introduction of a foreign matter, penetration of a nail, or the like, or can be suppressed from being contracted upon an increase in temperature. In order to increase cost effectiveness while suppressing an increase in thickness of electrode assembly 200, it is preferable to form heat-resistant layer 232 only on one surface of substrate 231.

Porous substrate 231 can solely function as a separator. Substrate 231 is composed of a resin layer or a nonwoven fabric. As substrate 231, a porous film having ion permeability and electric insulation property can be used. The thickness of substrate 231 is, for example, approximately more than or equal to 1 μm and less than or equal to 20 μm. Examples of the material of substrate 231 include olefin resins such as polyethylene, polypropylene, ethylene-propylene copolymer, ethylene, propylene, and copolymers with other α-olefins. Substrate 231 is preferably composed of a polyolefin layer. The melting point of substrate 231 is generally approximately less than or equal to 200° C.

The porous film included in substrate 231 is provided with a multiplicity of pores for permeation of lithium ions; however, the unevenness of the surface of the porous film is smaller than the unevenness of the surface of heat-resistant layer 232, and the surface of the porous film is flatter than the surface of heat-resistant layer 232. The size (maximum length) of each hole or recess in the surface of substrate 231 is, for example, less than 0.5 μm, and is preferably less than 0.3 μm.

Heat-resistant layer 232 can be composed of a resin having a higher melting point or softening point than that of the resin of substrate 231, such as an aramid resin, polyimide, or polyamideimide. Preferably, heat-resistant layer 232 is mainly composed of an inorganic compound. Heat-resistant layer 232 is preferably composed of: insulative inorganic particles; and a binder that binds the inorganic particles and that binds the inorganic particles and substrate 231. As with substrate 231, heat-resistant layer 232 has ion permeability and electric insulation property. The thickness of heat-resistant layer 232 is, for example, approximately more than or equal to 1 μm and less than or equal to 10 μm, and is preferably approximately more than or equal to 1 μm and less than or equal to 6 μm.

As the inorganic particles to be the main component of heat-resistant layer 232, at least one selected from alumina, boehmite, aluminum hydroxide, silica, titania, and zirconia can be used, for example. Preferably, alumina is used as the inorganic particles. The content of the inorganic particles is preferably approximately more than or equal to 85 mass % and less than or equal to 99.9 mass %, and is more preferably approximately more than or equal to 90 mass % and less than or equal to 99.5 mass %, with respect to the mass of heat-resistant layer 232.

The shape of each of the inorganic particles is not particularly limited, and particles each having a spherical shape, a quadrangular prism shape, or the like can be used, for example. The average particle diameter of the particles each having a spherical shape or the average length of sides of the particles each having a quadrangular prism shape is preferably approximately more than or equal to 0.1 μm and less than or equal to 1.5 μm, and is more preferably approximately more than or equal to 0.5 μm and less than or equal to 1.2 μm. When the particle diameters of the inorganic particles fall within the above range, heat-resistant layer 232 can be formed to have excellent ion permeability and excellent durability. The average particle diameter of the inorganic particles and the average length of the sides of the inorganic particles are measured by observing the surface of heat-resistant layer 232 using a scanning electron microscope (SEM). Specifically, the average particle diameter of the inorganic particles and the average length of the sides of the inorganic particles can be calculated by randomly selecting 100 inorganic particles in an SEM image of heat-resistant layer 232, measuring the diameters of circles circumscribed on the particles or measuring the lengths of the sides of the particles, and performing averaging.

As the binder included in heat-resistant layer 232, the same binder as the binder included in each of the positive electrode composite layer and the negative electrode composite layer can be used. The content of the binder is preferably approximately more than or equal to 0.1 mass % and less than or equal to 15 mass %, and is more preferably approximately more than or equal to 0.5 mass % and less than or equal to 10 mass %, with respect to the mass of heat-resistant layer 232. Heat-resistant layer 232 is formed by, for example, applying a slurry containing the inorganic particles and the binder onto one surface of the porous film of substrate 231 and drying the applied film.

Heat-resistant layer 232 thus formed has a higher permeability for moisture and ions than that of substrate 231.

Separator 230 is adhered to the positive electrode composite layer of positive electrode plate 210 and the negative electrode composite layer of negative electrode plate 220 by adhesive layer 240 including adhesive particles. In the present embodiment, heat-resistant layer 232 of separator 230 and the positive electrode composite layer of positive electrode plate 210 are adhered to each other by an adhesive layer 241 (first adhesive layer), and substrate 231 of separator 230 and the negative electrode composite layer of negative electrode plate 220 are adhered to each other by an adhesive layer 242 (second adhesive layer) as shown in FIG. 2.

The thickness of adhesive layer 240 is approximately more than or equal to 0.1 μm and less than or equal to 1 μm, or is approximately more than or equal to 0.2 μm and less than or equal to 0.9 μm, for example. The thickness of adhesive layer 240 is determined by amount, particle diameters, or the like of the adhesive particles. Adhesive layer 240 is formed by, for example, applying a slurry containing the adhesive particles onto the surface of separator 230 and drying the slurry. For the slurry of the adhesive particles, a so-called emulsion can be used in which minute adhesive particles are dispersed in water. In this case, separator 230 can be obtained to have both surfaces on which adhesive layers 240 each composed of the adhesive particles are formed.

Electrode assembly 200 is obtained by: stacking negative electrode plate 220, separator 230 having adhesive layers 240 formed thereon, positive electrode plate 210, and separator 230 having adhesive layers 240 formed thereon in this order; and performing thermal pressing. Adhesive force between separator 230 and each electrode plate (each of positive electrode plate 210 and negative electrode plate 220) can be adjusted by changing thermal pressing conditions such as temperature, pressure, and pressure application time. The thermal pressing conditions cannot be made different between an interface between separator 230 and positive electrode plate 210 and an interface between separator 230 and negative electrode plate 220.

As the adhesive particles included in adhesive layer 240, a plurality of different types of adhesive particles may be used; however, in consideration of productivity and the like, the same type of adhesive particles are preferably used. That is, the same type of adhesive particles are preferably present between substrate 231 of separator 230 and positive electrode plate 210, and between heat-resistant layer 232 of separator 230 and negative electrode plate 220. Here, for example, the same type of adhesive particles refer to adhesive particles provided as the same product, and a production lot may be different.

The average particle diameter of the adhesive particles is, for example, approximately more than or equal to 0.1 μm and less than or equal to 1 μm, and is preferably approximately more than or equal to 0.5 μm and less than or equal to 0.7 μm. The average particle diameter of the adhesive particles is measured by observing the surface of separator 230 using a SEM as with the average particle diameter of the inorganic particles included in heat-resistant layer 232.

The adhesive particles of adhesive layer 240 can be melted or softened in the thermal pressing step. Due to the adhesive particles being melted or softened, adhesive layer 240 is strongly adhered to the surfaces of separator 230 and the electrode plate (each of positive electrode plate 210 and negative electrode plate 220), thereby obtaining excellent adhesion. Adhesive layer 240 is composed of, for example, a resin having a glass transition temperature of less than or equal to 80° C. Adhesive layer 240 preferably includes an acrylic-resin-based adhesive material, an epoxy-resin-based adhesive material, a styrene-butadiene-rubber-based adhesive material, a silicone-rubber-based adhesive material, and a PVdF-based adhesive material. Among them, the acrylic-resin-based adhesive material is more preferable.

As described above, in electrode assembly 200, the mass of the adhesive particles per unit area at the interface between the negative electrode composite layer of negative electrode plate 220 and heat-resistant layer 232 is larger than the mass of the adhesive particles per unit area at the interface between the positive electrode composite layer of positive electrode plate 210 and substrate 231.

In other words, the coating weight of adhesive layer 241 (first adhesive layer) provided between positive electrode plate 210 and separator 230 is smaller than the coating weight of adhesive layer 242 (second adhesive layer) provided between negative electrode plate 220 and separator 230. That is, as shown in FIG. 3, the coating weight of adhesive layer 241 (first adhesive layer) formed on heat-resistant layer 232 (first surface) is smaller than the coating weight of adhesive layer 242 (second adhesive layer) formed on substrate 231 (second surface).

Further, in electrode assembly 200, the total of the coating weight of adhesive layer 241 (first adhesive layer) provided between positive electrode plate 210 and separator 230 and the coating weight of adhesive layer 242 (second adhesive layer) provided between negative electrode plate 220 and separator 230 is approximately more than or equal to 0.03 $g/m^2$ and less than or equal to 0.15 $g/m^2$. Here, the coating weight of adhesive layer 241 (first adhesive layer) provided between positive electrode plate 210 and separator 230 is preferably approximately more than or equal to 0.01 $g/m^2$ and less than or equal to 0.05 $g/m^2$.

Since the total of the coating weights of adhesive layers 240 on both surfaces of separator 230 is approximately more than or equal to 0.03 $g/m^2$ and less than or equal to 0.15 $g/m^2$ in electrode assembly 200, the amount of adhesive layers 240 can be appropriate. More specifically, adhesive force between the electrode plate (each of positive electrode plate 210 and negative electrode plate 220) and separator 230 can be suppressed from being too strong. As a result, in the drying step in the process of manufacturing of prismatic secondary battery 1, a clearance to serve as a path for drying out moisture can be readily secured between positive electrode plate 210 and negative electrode plate 220, thereby suppressing generation of a gas due to a reaction between remaining moisture and the electrode active material as well as expansion of battery case 100 due to the gas.

Particularly, with the relatively small coating weight of adhesive layer 241 provided on the positive electrode plate 210 side, the clearance to serve as the path for drying out moisture can be readily secured on the positive electrode plate 210 side. Thus, expansion of battery case 100 can be more effectively suppressed. Further, since heat-resistant layer 232 having a higher moisture permeability than that of substrate 231 is disposed on the positive electrode plate 210 side, the path for drying out moisture can be secured more readily on the positive electrode plate 210 side.

It should be noted that the mass of the adhesive particles per unit area at the interface between the positive electrode composite layer and heat-resistant layer 232 can be calculated by measuring the number of the adhesive particles adhered on the surface of the positive electrode composite layer and the surface of heat-resistant layer 232 and multiplying the total volume of the particles by the specific gravity of the particles. The mass of the adhesive particles per unit area at the interface between the negative electrode composite layer and substrate 231 can also be calculated in the same manner.

Figure 4:
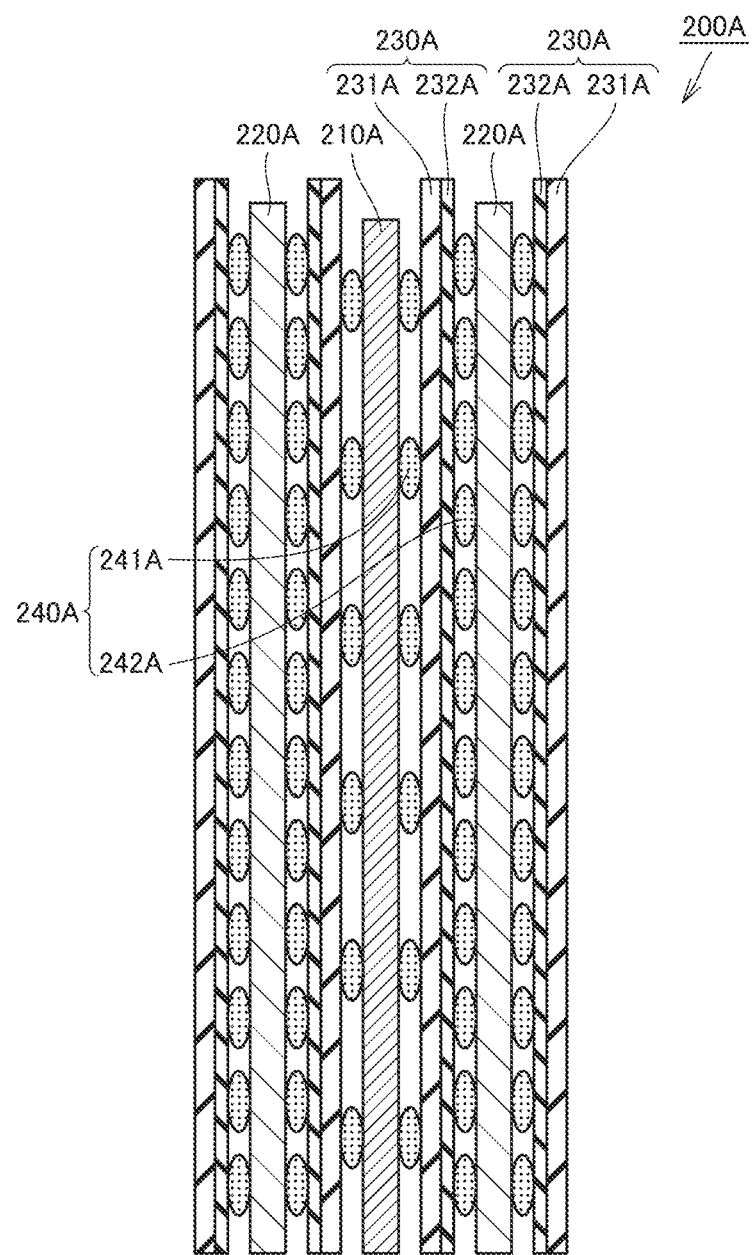
FIG. 4 is a cross sectional view showing a structure of an electrode assembly according to a modification.
Figure 5:
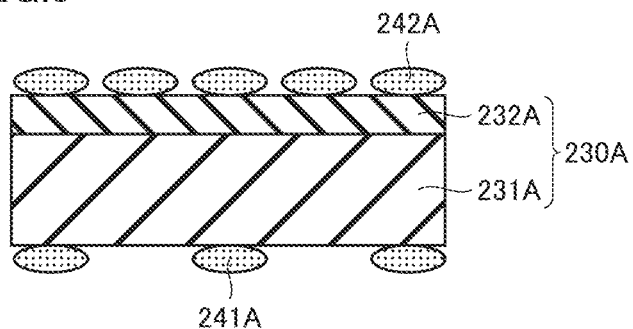
FIG. 5 is a cross sectional view showing a separator and adhesive layers in the electrode assembly shown in FIG. 4.

FIG. 4 is a cross sectional view showing a structure of an electrode assembly 200A according to a modification. Electrode assembly 200A includes positive electrode plates 210A, negative electrode plates 220A, separators 230A, and adhesive layers 240A. FIG. 5 is a cross sectional view showing separator 230A and adhesive layers 240A in electrode assembly 200A.

As shown in FIG. 4, in electrode assembly 200A, the coating weight of adhesive layer 241A provided between positive electrode plate 210A and separator 230A is smaller than the coating weight of adhesive layer 242A provided between negative electrode plate 220A and separator 230A. That is, as shown in FIG. 5, the coating weight of adhesive layer 241A formed on substrate 231A is smaller than the coating weight of adhesive layer 242A formed on heat-resistant layer 232A.

Also in the modification shown in FIGS. 4 and 5, the total of the coating weights of adhesive layers 240A on the both surfaces of separator 230A is approximately more than or equal to 0.03 g/m² and less than or equal to 0.15 g/m². Thus, the amount of adhesive layers 240A is appropriate, thereby readily securing a clearance to serve as a path for drying out moisture in the drying step.

Figure 6:
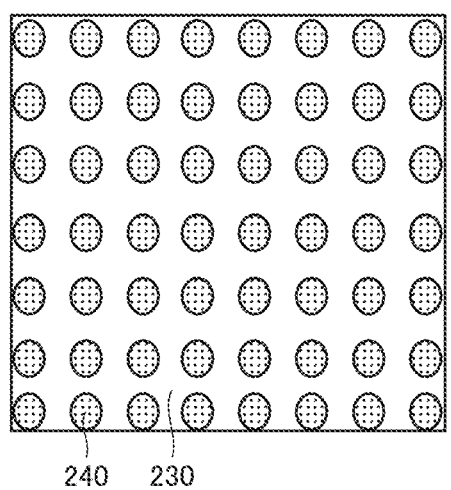
FIG. 6 is a plan view showing an exemplary arrangement of an adhesive layer on the separator.
Figure 7:
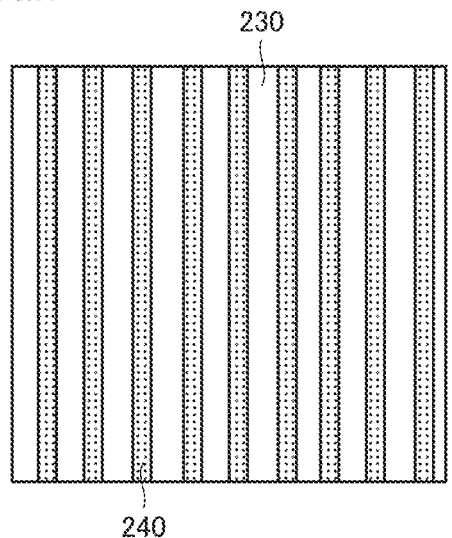
FIG. 7 is a plan view showing another exemplary arrangement of the adhesive layer on the separator.
Figure 8:
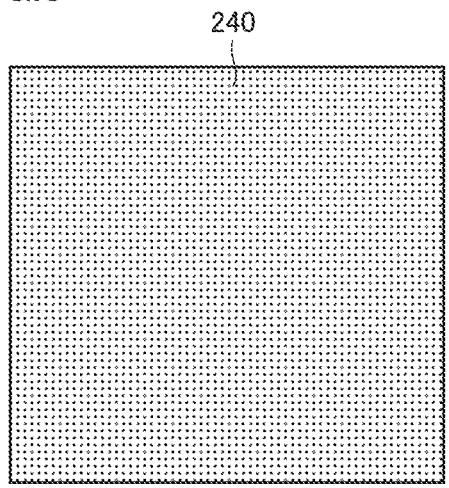
FIG. 8 is a plan view showing still another exemplary arrangement of the adhesive layer on the separator.
Figure 9:
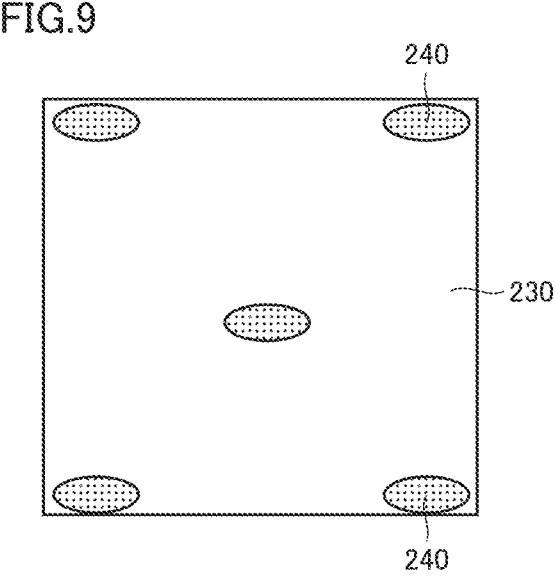
FIG. 9 is a plan view showing yet another exemplary arrangement of the adhesive layer on the separator.

Each of FIGS. 6 to 9 is a plan view showing an exemplary arrangement of adhesive layer 240 on separator 230. Adhesive layer 240 may be arranged in the form of dots as shown in FIG. 6, may be arranged in the form of stripes as shown in FIG. 7, may be arranged on the entire surface as shown in FIG. 8, or may be arranged in the form of islands as shown in FIG. 9. Adhesive layers 240 may be arranged in the same manner on the both surfaces of separator 230 when viewed in plan or may be arranged in different manners on the both surfaces of separator 230 when viewed in plan. Adhesive layers 240 may have the same thickness or different thicknesses on the both surfaces of separator 230. In order to secure the path for drying out moisture, adhesive layer 240 is preferably partially disposed on separator 230 (the examples of FIGS. 6, 7, and 9).

Figure 10:
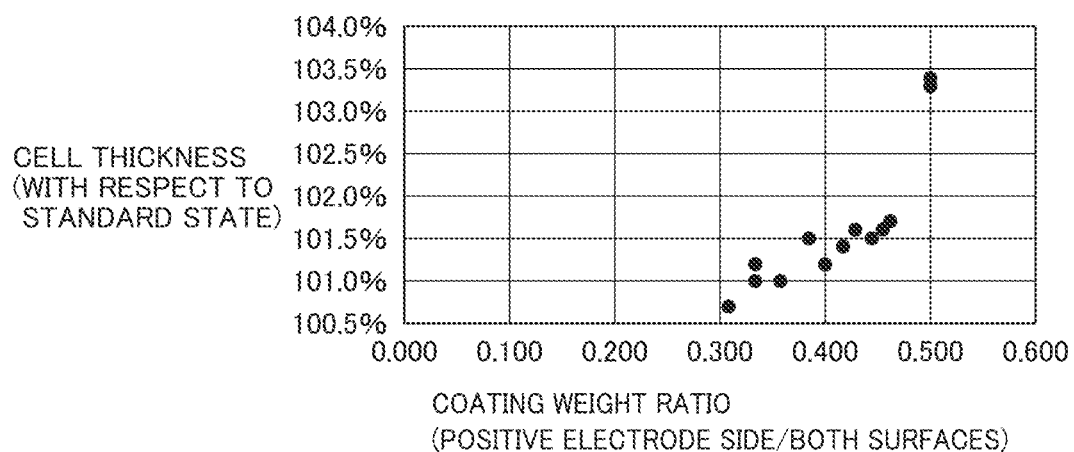
FIG. 10 is a diagram showing a relation between a ratio of coating weights of the adhesive layers formed on both surfaces of the separator and a cell expansion ratio (with respect to a cell thickness in a standard state).

FIG. 10 is a diagram showing a relation between a ratio (positive electrode side/both surfaces) of the coating weights of adhesive layers 240 formed on the both surfaces of separator 230 in electrode assembly 200 and a cell expansion ratio (with respect to a cell thickness in a standard state). Table 1 shows numerical values of samples shown in FIG. 10.

TABLE 1

| | Coating Weight of Adhesive Layer (g/m²) | | | |
| --- | --- | --- | --- | --- |
| | Positive Electrode Side (Heat-Resistant Layer 232 Side) | Negative Electrode Side (Substrate 231 Side) | Coating Weight Ratio (Positive Electrode Side/Both Surfaces) | Cell Thickness (with respect to Standard State) |
| Comparative Example 1 | 0.07 | 0.07 | 0.500 | 103.4% |
| Comparative Example 2 | 0.05 | 0.05 | 0.500 | 103.3% |
| Example 1 | 0.06 | 0.07 | 0.462 | 101.7% |
| Example 2 | 0.06 | 0.08 | 0.429 | 101.6% |
| Example 3 | 0.05 | 0.06 | 0.455 | 101.6% |
| Example 4 | 0.05 | 0.08 | 0.385 | 101.5% |
| Example 5 | 0.04 | 0.05 | 0.444 | 101.5% |
| Example 6 | 0.05 | 0.07 | 0.417 | 101.4% |
| Example 7 | 0.04 | 0.06 | 0.400 | 101.2% |
| Example 8 | 0.03 | 0.06 | 0.333 | 101.2% |
| Example 9 | 0.05 | 0.09 | 0.357 | 101.0% |
| Example 10 | 0.04 | 0.08 | 0.333 | 101.0% |
| Example 11 | 0.04 | 0.09 | 0.308 | 100.7% |

As shown in FIG. 10 and Table 1, the expansion ratio of battery case 100 ("Cell Thickness" in FIG. 10 and Table 1) can be suppressed by setting the ratio of the coating weight on the positive electrode side to be smaller than 0.5, i.e., by setting the coating weight on the positive electrode side to be smaller than the coating weight on the negative electrode side.

It should be noted that the present inventors have confirmed that, in each of Comparative Examples A to E shown in Table 2, the expansion ratio of battery case 100 is significantly increased as compared with the results shown in Table 1. It should be noted that in each of Comparative Examples A to E, substrate 231A of separator 230A is disposed on the positive electrode side, and heat-resistant layer 232A is arranged on the negative electrode side as shown in FIGS. 4 and 5.

TABLE 2

| | Coating Weight of Adhesive Layer (g/m²) | | |
| --- | --- | --- | --- |
| | Positive Electrode Side (Substrate 231A Side) | Negative Electrode Side (Heat-Resistant Layer 232A Side) | Coating Weight Ratio (Heat-Resistant Layer 232A Side/Both Surfaces) |
| Comparative Example A | 0.30 | 0.35 | 0.538 |
| Comparative Example B | 0.33 | 0.50 | 0.602 |
| Comparative Example C | 0.22 | 0.50 | 0.694 |

TABLE 2-continued

| | Coating Weight of Adhesive Layer (g/m²) | | |
|---|---|---|---|
| | Positive Electrode Side (Substrate 231A Side) | Negative Electrode Side (Heat-Resistant Layer 232A Side) | Coating Weight Ratio (Heat-Resistant Layer 232A Side/Both Surfaces) |
| Comparative Example D | 0.35 | 0.80 | 0.696 |
| Comparative Example E | 0.18 | 0.35 | 0.660 |

It is considered that the expansion ratio of battery case 100 was significantly increased in each of Comparative Examples A to E shown in Table 2 mainly due to the following reasons: the total of the coating weights of adhesive layers 240A on the both surfaces of separator 230A is large, i.e., is more than or equal to 0.5 g/m²; and substrate 231A, with which it is more difficult to secure the path for drying out moisture as compared with the case of heat-resistant layer 232A, is disposed on the positive electrode side.

On the other hand, in each of Examples 1 to 11 of the present technology shown in Table 1, it is understandable that the total of the coating weights of adhesive layers 240 on the both surfaces of separator 230 is small, i.e., is less than or equal to 0.15 g/m², the coating weight on the positive electrode side is particularly small, and heat-resistant layer 232, with which it is easier to secure the path for drying out moisture as compared with the case of substrate 231, is disposed on the positive electrode side, with the result that the expansion ratio of battery case 100 can be effectively suppressed.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A battery comprising an electrode assembly including a positive electrode plate, a negative electrode plate, and a separator disposed between the positive electrode plate and the negative electrode plate, wherein
    a first adhesive layer is provided between the positive electrode plate and the separator,
    a second adhesive layer is provided between the negative electrode plate and the separator,
    a coating weight of the first adhesive layer is smaller than a coating weight of the second adhesive layer, and
    a total of the coating weight of the first adhesive layer and the coating weight of the second adhesive layer is more than or equal to 0.03 g/m² and less than or equal to 0.15 g/m².

2. The battery according to claim 1, wherein the coating weight of the first adhesive layer is more than or equal to 0.01 g/m² and less than or equal to 0.05 g/m².

3. The battery according to claim 1, wherein
    the separator includes a substrate composed of a resin, and a heat-resistant layer including inorganic particles and a binder, the heat-resistant layer being provided on the substrate,
    the heat-resistant layer and the positive electrode plate face each other with the first adhesive layer being interposed between the heat-resistant layer and the positive electrode plate, and
    the substrate and the negative electrode plate face each other with the second adhesive layer being interposed between the substrate and the negative electrode plate.

4. The battery according to claim 1, wherein the positive electrode plate has a positive electrode composite layer including a lithium transition metal composite oxide.

5. The battery according to claim 1, wherein each of the first adhesive layer and the second adhesive layer includes at least one adhesive material from a group consisting of an acrylic-resin-based adhesive material, an epoxy-resin-based adhesive material, a styrene-butadiene-rubber-based adhesive material, a silicone-rubber-based adhesive material, and a PVdF-based adhesive material.

6. A method of manufacturing a battery, the method comprising forming an electrode assembly including a positive electrode plate, a negative electrode plate, and a separator disposed between the positive electrode plate and the negative electrode plate, the separator having a first surface facing the positive electrode plate and a second surface facing the negative electrode plate, wherein
    the forming of the electrode assembly includes
        forming a first adhesive layer on the first surface of the separator and forming a second adhesive layer on the second surface of the separator,
        adhering the separator and the positive electrode plate to each other with the first adhesive layer being interposed between the separator and the positive electrode plate, and
        adhering the separator and the negative electrode plate to each other with the second adhesive layer being interposed between the separator and the negative electrode plate,
    a coating weight of the first adhesive layer is smaller than a coating weight of the second adhesive layer, and
    a total of the coating weight of the first adhesive layer and the coating weight of the second adhesive layer is more than or equal to 0.03 g/m² and less than or equal to 0.15 g/m².

7. The method of manufacturing the battery according to claim 6, wherein the coating weight of the first adhesive layer is more than or equal to 0.01 g/m² and less than or equal to 0.05 g/m².

8. The method of manufacturing the battery according to claim 6, wherein
    the separator includes a substrate composed of a resin, and a heat-resistant layer including inorganic particles and a binder, the heat-resistant layer being provided on the substrate,
    the forming of the electrode assembly includes
        adhering the heat-resistant layer and the positive electrode plate to each other with the first adhesive layer being interposed between the heat-resistant layer and the positive electrode plate, and adhering the substrate and the negative electrode plate to each other with the second adhesive layer being interposed between the substrate and the negative electrode plate.

9. The method of manufacturing the battery according to claim 6, wherein the positive electrode plate has a positive electrode composite layer including a lithium transition metal composite oxide.

10. The method of manufacturing the battery according to claim 6, wherein each of the first adhesive layer and the second adhesive layer includes at least one adhesive material from a group consisting of an acrylic-resin-based adhesive material, an epoxy-resin-based adhesive material, a styrene-butadiene-rubber-based adhesive material, a silicone-rubber-based adhesive material, and a PVdF-based adhesive material.

* * * * *